No. 856,705.  
PATENTED JUNE 11, 1907.  
F. C. KAVANAGH.  
HAT FASTENER.  
APPLICATION FILED DEC. 15, 1906.
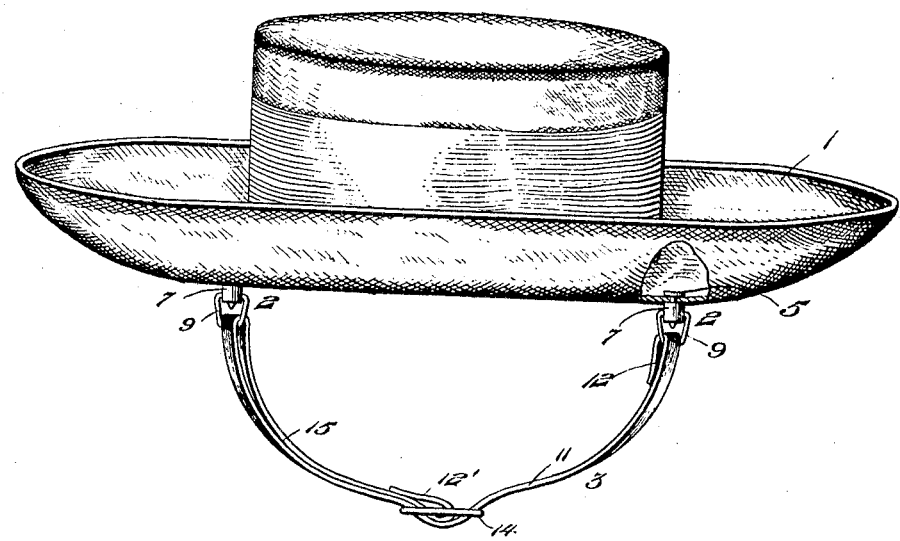
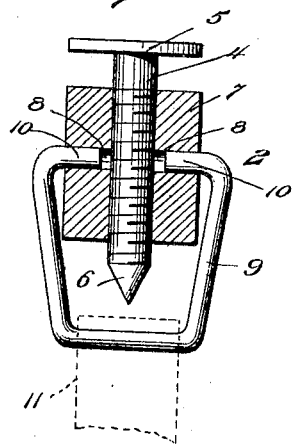
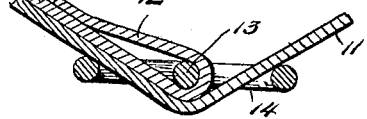
Witnesses  
O. M. Offutt  
G. M. Spring
Inventor  
Frank C. Kavanagh,  
By E. E. Vrooman,  
his Attorney er within which the shank 4 is normally
UNITED STATES PATENT OFFICE.

FRANK C. KAVANAGH, OF SEATTLE, WASHINGTON.

HAT-FASTENER.

No. 856,705.  Specification of Letters Patent.  Patented June 11, 1907.

Application filed December 15, 1906. Serial No. 348,014.

*To all whom it may concern:*

Be it known that I, FRANK C. KAVANAGH, a citizen of the United States, residing at Seattle, in the county of King and State of Washington, have invented certain new and useful Improvements in Hat-Fasteners, of which the following is a specification, reference being had therein to the accompanying drawing.

This invention relates to improvements in hat fasteners, and the object of the invention is the provision of means for facilitating the holding of a hat upon the head of a person.

With this and other objects in view, the invention consists of certain novel constructions, combinations, and arrangements of parts, as will be hereinafter fully described and claimed.

In the drawings: Figure 1 is a perspective view of a hat and my improved fastener attached thereto. Fig. 2 is an enlarged view of one of the fastening devices, a portion of which is shown in vertical section. Fig. 3 is a longitudinally, sectional view of the clamp-member carried by the connecting-member of the fastening device.

Referring to the drawings, 1 designates a hat of any suitable construction, to which is attached fastening devices 2. The fastening devices are connected by means of preferably a flexible connecting-member 3.

Each of the fastening devices 2 comprises a threaded member or shank 4 provided at one end with a head or cap 5, and its opposite end 6 is preferably sharpened or pointed. A revoluble locking member 7 is threaded upon the shank 4. The member 7 is provided with apertures 8, 8 formed upon diametrically opposite portions of the same. These apertures open at their inner end into the main longitudinally-extending threaded aperture within which the shank 4 is normally positioned, thereby permitting the side apertures 8 to be easily cleaned of any foreign substance which becomes lodged therein.

A bail 9 is provided with inwardly extending horizontal ends 10, which ends 10 are normally positioned within the apertures 8 of the locking members 7. The bail 9 is preferably formed of material having sufficient resiliency to produce a clamping action, so as to hold the ends 10 within the apertures 8, after said ends have been positioned therein. The bail 9 has a free pivotal movement upon the locking member 7, and said bail may be used to assist in threading the locking member 7 upon shank 4.

The connecting-member 3 is preferably formed of an elastic strip 11, one end of which strip 11 is threaded through the bail 9 of one of the fastening devices 2 and secured against the strip 11, as at 12, Fig. 1, producing a loop at one end that is attached to one of the bails. The strip or piece 11, preferably formed of elastic material, is threaded through the bail 9 of the other fastening or attaching device, and the end passed around the central transverse-member 13 of a clamp 14, Fig. 3, forming a loop 12'. It is to be noted that a portion of the connecting-member 11, between one of the bails 2 and the clamping-member 14, is folded back upon said connecting-member, as at 15, Fig. 1. The connecting-member 11 is threaded through and positioned between the ends of the clamp 14 and passed under the central member 13 thereof, as clearly seen in Fig. 3. By manually adjusting the clamp 14 longitudinally upon the connecting-member 15, the length of said connecting-member can be altered. The clamp will normally be retained in its adjusted position because the same will bind against strip 11 and its overlapped portion 15, contiguous to the loop 12'.

When it is desired to attach the fastener to a hat, this can be quickly accomplished by forcing the threaded shanks through preferably the brim of the hat and quickly threading the locking members 7, through the medium of bails 9 and heads 5, upon said shanks. The wearer can quickly adjust the connecting-member 11 to his head, and if it is desired, the connecting-member can be employed for carrying the hat.

What I claim is:

1. In a hat fastener, the combination of fastening devices, each fastening device comprising a threaded member, a revoluble locking member, said locking member provided with a pair of apertures formed in diametrically opposite portions thereof, a bail provided with horizontal ends extending toward each other, the ends of said bail positioned within the apertures of said locking member, and means connecting the bails of the fastening devices.

2. In a hat fastener, the combination of fastening devices, each fastening device comprising a threaded-member provided with a head at one end and having its opposite end pointed, a locking member provided with a longitudinally extending aperture, threaded upon said threaded-member, said locking member provided with apertures positioned at an angle to said first-mentioned aperture, a connecting-member, and means positioned within the last-mentioned apertures of said locking members and connecting said connecting-member to said locking members.

3. In a hat fastener, the combination of fastening devices, each fastening device comprising a stationary member, a revoluble locking member carried by said stationary member, a pivotally mounted bail clamping said locking member, and means connecting the bails of said fastening devices.

In testimony whereof I hereunto affix my signature in presence of two witnesses.

FRANK C. KAVANAGH.

Witnesses:
J. M. SPARKMAN,
FRED H. LAWING.